United States Patent [19]
D'Silva et al.

[11] B 3,925,674

[45] Dec. 9, 1975

[54] X-RAY IMAGE INTENSIFIER PHOSPHOR

[75] Inventors: Arthur P. D'Silva; Velmer A. Fassel, both of Ames, Iowa

[73] Assignee: The United States of America as represented by the United States Atomic Energy Commission, Washington, D.C.

[22] Filed: Jan. 30, 1973

[21] Appl. No.: 327,899

[44] Published under the Trial Voluntary Protest Program on January 28, 1975 as document no. B 327,899.

[52] U.S. Cl. ... 250/483; 252/301.4 P; 252/301.4 R; 427/65; 427/157
[51] Int. Cl.² ......................................... G01D 15/14
[58] Field of Search .......... 117/33.5 R; 252/301.4 P, 252/301.4 R; 250/483; 427/65, 157

[56] References Cited
UNITED STATES PATENTS

| | | | |
|---|---|---|---|
| 2,968,725 | 1/1961 | Ter-Pogossian | 117/33.5 R |
| 3,487,884 | 12/1969 | Palilla et al. | 252/301.4 P |
| 3,527,710 | 9/1970 | Toma et al. | 252/301.4 P |
| 3,542,690 | 11/1970 | Borchardt | 252/301.4 P |
| 3,582,493 | 6/1971 | Haynes et al. | 252/301.4 R |

*Primary Examiner*—William D. Martin
*Assistant Examiner*—William R. Trenor
*Attorney, Agent, or Firm*—Dean E. Carlson; Arthur A. Churm; James W. Weinberger

[57] ABSTRACT

$Y_{1-x}Gd_x.PO_4:Tb^{3+}$ is an effective phosphor for use in X-ray intensifier screens and in nuclear radiation detection systems.

1 Claim, No Drawings

X-RAY IMAGE INTENSIFIER PHOSPHOR

CONTRACTUAL ORIGIN OF THE INVENTION

The invention described herein was made in the course of, or under, a contract with the United States Atomic Energy Commission.

BACKGROUND OF THE INVENTION

This invention relates to a fluorescent phosphor which emits violet-blue light when exposed to X-ray or gamma radiation and in particular to an X-ray intensifier screen embodying this phosphor.

X-ray image intensifier screens are placed against photographic film for intensifying the effect of X-ray emission and by so doing permit reduced X-ray exposures. The screen, such as described in U.S. Pat. No. 2,968,725, includes a base layer of material transparent to X-rays and opaque to visible light. A coating of an X-ray excitable phosphor is disposed upon one side of the screen and dispersed in a binder. The phosphor absorbs a portion of the X-radiation and emits it in the blue-violet-ultraviolet region of the spectrum to which X-ray film is sensitive. In the past, calcium tungstate phosphors have been widely used as the X-ray excitable fluorescent material. Europium activated barium orthophosphate phosphor as described in U.S. Pat. No. 3,527,710 is also being used in X-ray image intensifying screens.

Terbium activated yttrium phosphate phosphors containing gadolinium as a sensitizer have been disclosed in U.S. Pat. No. 3,481,884 granted Dec. 2, 1969. These phosphors emit light in the green region of the spectrum and thus are not suitable for use in X-ray intensifier screens which require a phosphor emitting light in the blue region to match the response characteristics of X-ray film.

SUMMARY OF THE INVENTION

We have discovered that by using only small amounts of terbium in the phosphor $Y_{1-x}Gd_xPO_4$ where $x = 0.3$ to 0.1 will shift the spectral emission into the blue region of the spectrum and also produce a phosphor which is more sensitive to X-radiation than are the prior art phosphors. More specifically, 0.008 to 0.012 mole of Tb per mole of rare earth phosphate will produce an intense spectral emission in the 3,700 to 4,500 A region which matches the X-ray image response characteristics of blue sensitive X-ray film widely used in medical and industrial applications and also coincides with the spectral sensitivity of many high quantum efficiency photomultiplier tubes making it effective for optically detecting nuclear radiation. Higher concentrations of terbium will result in a shift of the emission spectrum into the green region at about 5,500 A and would be suitable for use with X-ray fluoroscopic screens.

The gadolinium content of the phosphor may range from 0.3 to 0.1 mole, although the preferred concentration at which the best results are obtained is 0.2 mole.

In the following Table I the emission peaks and bandwidths of yttrium gadolinium phosphate, calcium tungstate and barium orthophosphate are compared.

TABLE I

|  | Emission Peak under 10 Kvp X-rays, A | Bandwidth A |
| --- | --- | --- |
| $CaWO_4$ | 4200 | Very broad |
| $Ba_3(PO_4)_2.Eu^{2+}$ | 4130 | Very broad |
| $Y_{0.8}Gd_{0.2}PO_4.Tb^{3+}$ | 3820 | 80 |
|  | 4140 | 80 |
|  | 4300 | 100 |

The X-ray absorption characteristics of the phosphor can be increased by partially substituting lutetium, bismuth or thalium for some of the yttrium. This substitution will increase the X-ray absorption characteristics of the phosphor and will allow higher energy X-rays to be used or will permit a decrease in the weight of phosphor necessary to prepare an intensifier screen and improve resolution. By replacing natural gadolinium with $Gd^{157}$ which has a higher neutron capture cross section, the neutron absorption characteristics of the phosphor will be greatly enhanced permitting the phosphor to be used in an intensifier screen for neutron radiography.

DESCRIPTION OF PREFERRED EMBODIMENT

The following specific examples are typical of the preferred methods for preparing the phosphors.

EXAMPLE I 180.64 grams of $Y_2O_3$; 73.50 grams of $Gd_2O_3$; 3.73 grams of $Tb_4O_7$ (or an equivalent amount of $Tb_2O_3$); 264.0 grams of $(NH_4)_2HPO_4$ and 15 grams of finely powdered anhydrous $Na_4P_2O_7$ are intimately blended together. The mixture is initially heated in a silica crucible in air to 600° C for about 30 minutes. The mixture is allowed to cool, then reblended and heated in air to 1,200° C for 1 to 2 hours to obtain a fine white phosphor material in the formula $Y_{0.8}Gd_{0.2}PO_4:Tb^{3+}$ containing 0.01 mole terbium.

EXAMPLE II

The phosphor can also be prepared by dissolving 180.64 grams $Y_2O_3$; 73.50 gms $Gd_2O_3$ and 3.73 gms $Tb_4O_7$ in dilute nitric acid. The mixed nitrate solution is dried on a hot plate and after evaporation of the oxides of nitrogen, the dried mixture is converted to the rare earth oxide by igniting in a silica crucible at 1,200° C for 1 to 3 hours. This mixed oxide is then blended with 264 gms $(NH_4)_2HPO_4$ and 15 gms of finely ground anhydrous $Na_4P_2O_7$ and again heated at 1,200° C for 1 to 2 hours to obtain a fine white colored phosphor.

EXAMPLE III

Three intensifier screens were prepared to compare the sensitivities of $Y_{0.8}Gd_{0.2}PO_4:Tb^{3+}$, $CaWO_4$ and $Ba_3(PO_4)_2.Eu^{2+}$. An aluminum foil base was coated with a slurry of the phosphor in a gelatin-glycerine base and allowed to dry. Each screen was prepared to contain 150 mg of phosphor per square centimeter. The three screens were placed against a sheet of commercial medical radiographic film and exposed simultaneously to 80 Kvp X-rays for 0.01 sec. The film was developed and the density of the photographic images compared in a densitometer. The results are given in Table II below using calcium tungstate as the standard for comparison.

TABLE II

|  | Relative Sensitivity 80 Kvp X-Rays |
|---|---|
| $CaWO_4$ | 1.0 |
| $Ba_3(PO_4)_2.Eu^{2+}$ | 4.8 |
| $Y_{0.8}Gd_{0.2}PO_4.Tb^{3+}$ | 7.8 |

As can be seen, the terbium activated yttrium gadolinium phosphate phosphor provides greatly increased sensitivity to X-radiation as compared to the prior art phosphors.

The embodiments of the invention in which an exclusive property or privilege is claimed are defined as follows:

1. An X-ray intensifier screen including a base transparent to X-ray but opaque to ultraviolet-visible light; an X-ray excitable phosphor disposed upon said base, said X-ray excitable phosphor emitting ultraviolet-visible light, said phosphor having the formula $Y_{1-x}Gd_xPO_4:Tb^{+3}$ where $x = 0.3$ to $0.1$ and the terbium concentration is between about 0.008 and 0.012 mole per mole of phosphate, and a binder for retaining said X-ray excitable phosphor upon said base.

* * * * *